(12) United States Patent
Kugel et al.

(10) Patent No.: US 7,752,076 B2  
(45) Date of Patent: Jul. 6, 2010

(54) INVENTORY MANAGEMENT OF RESOURCES

(75) Inventors: Jacob Kugel, Rochester, MN (US); Carl Clair Pecinovsky, Rochester, MN (US); Christopher Robert Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 703 days.

(21) Appl. No.: 10/977,767

(22) Filed: Oct. 29, 2004

(65) Prior Publication Data  
US 2006/0095335 A1 May 4, 2006

(51) Int. Cl.  
*G06Q 30/00* (2006.01)

(52) U.S. Cl. .................................................. 705/26
(58) Field of Classification Search .................. 705/26, 705/27, 25  
See application file for complete search history.

(56) References Cited

U.S. PATENT DOCUMENTS

2002/0072988 A1* 6/2002 Aram ........................... 705/26  
2002/0116301 A1* 8/2002 Chapman et al. .............. 705/29  
2003/0158787 A1* 8/2003 Oda et al. ..................... 705/26

* cited by examiner

*Primary Examiner*—Mila Airapetian  
(74) *Attorney, Agent, or Firm*—Owen J. Gamon; Rainieri G. Ventura

(57) ABSTRACT

A method, apparatus, system, and signal-bearing medium that, in an embodiment, receive vendor resource data and vendor logic from vendors, receive customer resource data from a customer, build a page based on the customer resource data and the vendor resource data, send the page to the customer, and invoke the vendor logic in response to a request from the customer via the page. The page may describe both the current inventory of resources at the customer (based on the customer resource data) and resources that are available for purchase from the vendors (based on the vendor resource data). In various embodiments, the vendor logic purchases the resource from the vendor, requests information from the vendor, or registers the customer with the vendor. If a determination is made that a new resource is needed, either by the customer or by analysis of the customer resource data and rules for purchasing new resources, then a purchase request is sent to the vendor for the new resource.

7 Claims, 6 Drawing Sheets

INVENTORY MANAGEMENT OF RESOURCES

FIELD

An embodiment of the invention generally relates to computers. In particular, an embodiment of the invention generally relates to inventory management of resources in networked computers.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated and complex computer software has evolved to take advantage of the higher performance of the hardware, resulting in computer systems today that are much more powerful than just a few years ago.

Years ago, computers were isolated devices that did not communicate with each other. But, today computers are often connected in networks, and a user at one computer, often called a client, may wish to access information at multiple other computers, often called servers, via a network. The network may be a local network that connects computers associated with the same company, e.g., a LAN (Local Area Network), or it may be an external network, such as the Internet or World Wide Web, that connects computers from disparate users and companies. Further, the network may be a combination of local and external networks. Companies typically have multiple computers containing different hardware and software packages, often generically referred to as resources, attached to these networks.

Managing multiple computers attached to networks with resources obtained from a variety of third-party vendors is a difficult task. To aid the system administrator with this task, provisioning management software is available that manages installing, deploying, and maintaining resources in a complex heterogeneous networked environment. This software typically provides a "console" from which resources of a computer attached to the network may be managed. The console typically provides the ability to initialize switches and load balancers, install operating system and software products, configure the network, and apply patches, among other functions. The console typically represents resources as objects of particular classes or categories, e.g., servers. Each object category has specific logical operations that can be performed against it, such as powering on or off a server.

The provisioning management software can be supplemented via automation packages that plug into the provisioning management application and manipulate certain resources. For example, a vendor that supplies a resource can also provide a plug-in to install the resource or to install device drivers for the resource. Further, a vendor that sells network interface cards may provide a plug-in to install device drivers for its cards, where the device drivers implement logical operations to initialize the cards and turn the network interface ports on and off.

Unfortunately, provisioning management applications do not include a mechanism to represent possible resources that the customer does not yet own and a purchase avenue to acquire those resources. Thus, because of the large number of possible vendors, possible resources, and computers attached to a network, a system administrator can experience difficulty in determining what potential resources are available for purchase and installation at which computer.

SUMMARY

A method, apparatus, system, and signal-bearing medium are provided that, in an embodiment, receive vendor resource data and vendor logic from vendors, receive customer resource data from a customer, build a page based on the customer resource data and the vendor resource data, send the page to the customer, and invoke the vendor logic in response to a request from the customer via the page. The page may describe both the current inventory of resources at the customer (based on the customer resource data) and resources that are available for purchase from the vendors (based on the vendor resource data). In various embodiments, the vendor logic sends a purchase request for the resource to the vendor, requests information from the vendor, or registers the customer with the vendor. If a determination is made that a new resource is needed, either by the customer or by analysis of the customer resource data and rules for purchasing new resources, then a purchase request is sent to the vendor for the new resource.

DETAILED DESCRIPTION

In an embodiment, an inventory manager at a server receives vendor resource data and vendor logic from vendors, receives customer resource data from customers, builds pages based on the customer resource data and the vendor resource data, sends the pages to a customer, and invokes the vendor logic in response to a request from the customer. The customer uses the page to make the request. The page may describe both the current inventory of resources at the customer (based on the customer resource data) and resources that are available for purchase from the vendors (based on the vendor resource data). In various embodiments, the vendor logic sends a purchase request for the resource to the vendor, requests information from the vendor, or registers the customer with the vendor. If a determination is made that a new resource is needed, either by the customer or by an orchestration manager at the server by analyzing the customer resource data and rules for purchasing new resources, then the vendor logic sends a purchase request to the vendor for the new resource.

Figure 1:
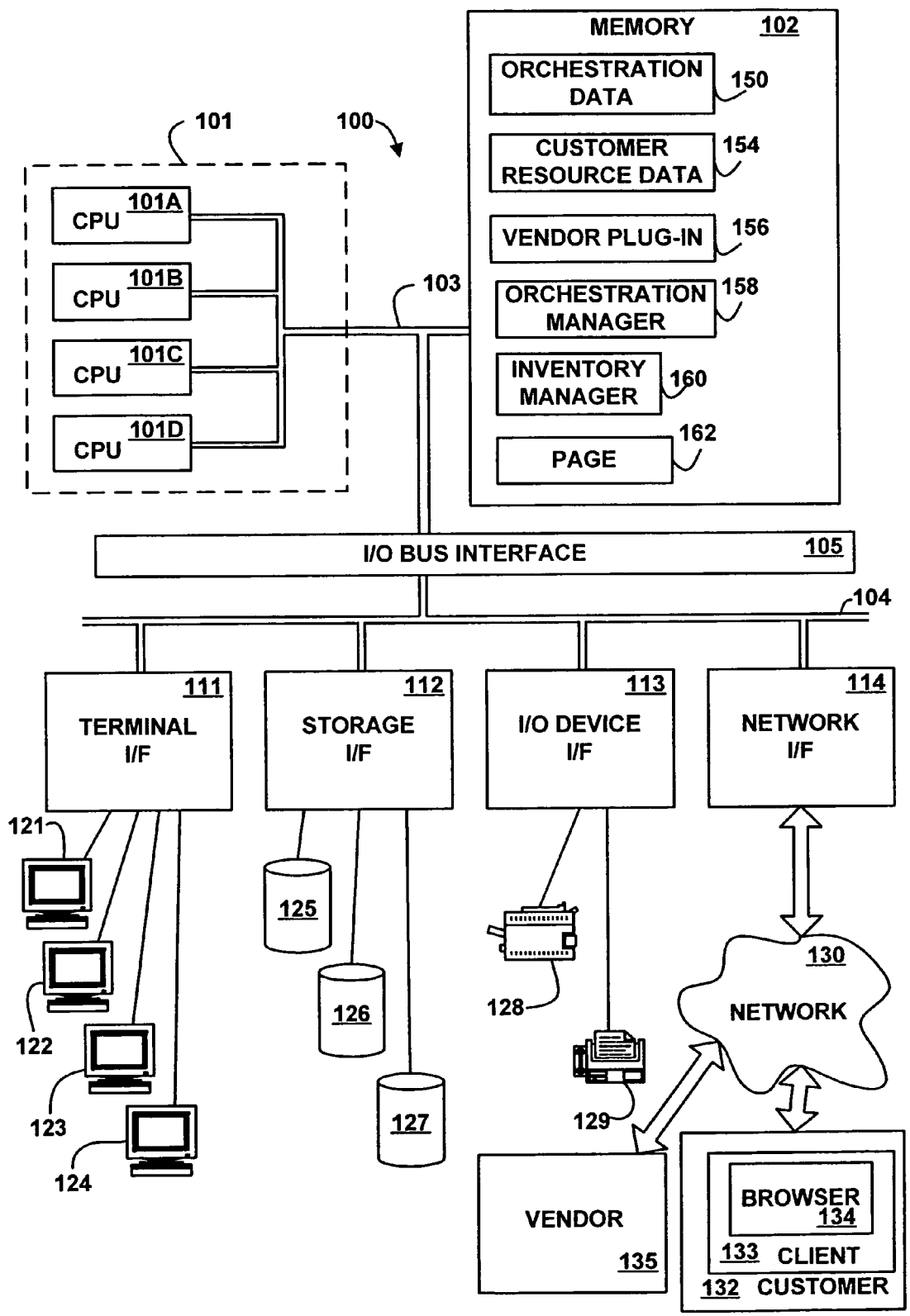
FIG. 1 depicts a block diagram of an example system for implementing an embodiment of the invention.

Referring to the Drawing, wherein like numbers denote like parts throughout the several views, FIG. 1 depicts a high-level block diagram representation of a computer system 100, operating as a server, connected to a customer 132 and a vendor 135 via a network 130, according to an embodiment of the present invention. The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as a processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing data and programs. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 102 includes orchestration data 150, customer resource data 154, a vendor plug-in 156, an orchestration manager 158, an inventory manager 160, and a page 162. Although the orchestration data 150, the customer resource data 154, the vendor plug-in 156, the orchestration manager 158, the inventory manager 160, and the page 162 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the orchestration data 150, the customer resource data 154, the vendor plug-in 156, the orchestration manager 158, the inventory manager 160, and the page 162 are illustrated as being contained within the main memory 102, these elements are not necessarily all completely contained in the same storage device at the same time. Further, although the orchestration data 150, the customer resource data 154, the vendor plug-in 156, the orchestration manager 158, the inventory manager 160, and the page 162 are illustrated as being separate entities, in other embodiments some of them, or portions of some of them, may be packaged together.

The orchestration data 150 includes customer rules that govern the circumstances under which the orchestration manager 158 coordinates the purchase of new resources for the customer 132, as further described below with reference to FIG. 5. In various embodiments, the customer resource data 154 describes the resources present at one, some, or all clients 133 in the customer 132 and performance and error statistics related to one, some, or all of the clients 133 in the customer 132. The customer resource data 154 is further described below with reference to FIG. 3A. The vendor plug-in 156 is supplied by a vendor provider (e.g., the vendor 135) of resources for the customer 132 and describes resources that may be available for use at the customer 132. The vendor plug-in 156 is further described below with reference to FIG. 3B.

The inventory manager 160 builds the page 162 using data from the vendor plug-in 156 and the customer resource data 154 and sends the page 162 to the client 133 at the customer 132. The page 162 may be implemented via HTML (Hypertext Markup Language), XML, or any other appropriate markup language. These embodiments may be desireable because the standard-based markup languages and pages allow for easy data exchange between heterogeneous systems. However, embodiments using proprietary data exchange formats and custom GUI "pages" are also within the scope of the present invention. In an embodiment, the inventory manager 160 includes instructions capable of executing on the processor 101 or statements capable of being interpreted by instructions executing on the processor 101 to perform the functions as further described below with reference to FIG. 4. In another embodiment, the inventory manager 160 may be implemented in microcode. In another embodiment, the inventory manager 160 may be implemented in hardware via logic gates and/or other appropriate hardware techniques.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI bus, or any other appropriate bus technology.

The I/O interface units support communication with a variety of storage and I/O devices. For example, the terminal interface unit 111 supports the attachment of one or more user terminals 121, 122, 123, and 124. The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the main memory 102 may be stored to and retrieved from the direct access storage devices 125, 126, and 127.

The I/O and other device interface 113 provides an interface to any of various other input/output devices or devices of other types. Two such devices, the printer 128 and the fax machine 129, are shown in the exemplary embodiment of FIG. 1, but in other embodiment many other such devices may exist, which may be of differing types. The network interface 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, etc. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol). In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number (including zero) of networks (of the same or different types) may be present.

The customer 132 includes one or more clients 133, each of which includes a browser 134. The customer 132 is also known as a customer datacenter, a customer asset base, or a customer enterprise. The browser 134 downloads the page 162 and interprets control tags and data to display the user interface as further described below with reference to FIGS. 2A and 2B. The client 133 may also include any or all of the hardware and/or software elements previously described above for the computer system 100. Although only one client 133 is illustrated in FIG. 1, in other embodiments any number of clients may be present. Although only one customer 132 is illustrated in FIG. 1, in other embodiments any number of customers may be present. Although the customer 132 is illustrated as being separate from the server 100 and accessing the server 100 via the network 130, in another embodiment, the server 100 is part of the customer 132.

The vendor 135 may include any or all of the hardware and/or software elements previously described above for the computer system 100. In an embodiment, the vendor 135 is the source for the vendor plug-in 156 via the network 130, but in other embodiments, the vendor 135 is present but not connected to the network 130, not present, optional, or not used. The vendor 135 is the source of resources available for purchase by the customer 132. Although only one vendor 135 is illustrated in FIG. 1, in other embodiments any number of vendors, including zero, may be present.

It should be understood that FIG. 1 is intended to depict the representative major components of the computer system 100, the network 130, the customer 132, and the vendor 135 at a high level, that individual components may have greater complexity that represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors 101 in the computer system 100, cause the computer system 100 to perform the steps necessary to execute steps or elements comprising the various aspects of an embodiment of the invention.

Moreover, while embodiments of the invention have and hereinafter will be described in the context of fully functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of signal-bearing media, which include, but are not limited to:

(1) information permanently stored on a non-rewriteable storage medium, e.g., a read-only memory device attached to or within a computer system, such as a CD-ROM, DVD-R, or DVD+R;

(2) alterable information stored on a rewriteable storage medium, e.g., a hard disk drive (e.g., the DASD 125, 126, or 127), CD-RW, DVD-RW, DVD+RW, DVD-RAM, or diskette; or (3) information conveyed by a communications medium, such as through a computer or a telephone network, e.g., the network 130, including wireless communications.

Such signal-bearing media, when carrying machine-readable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying software systems and web services that implement, some or all of the methods described herein. Aspects of these embodiments may also include analyzing the client company, creating recommendations responsive to the analysis, generating software to implement portions of the recommendations, integrating the software into existing processes and infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2A:
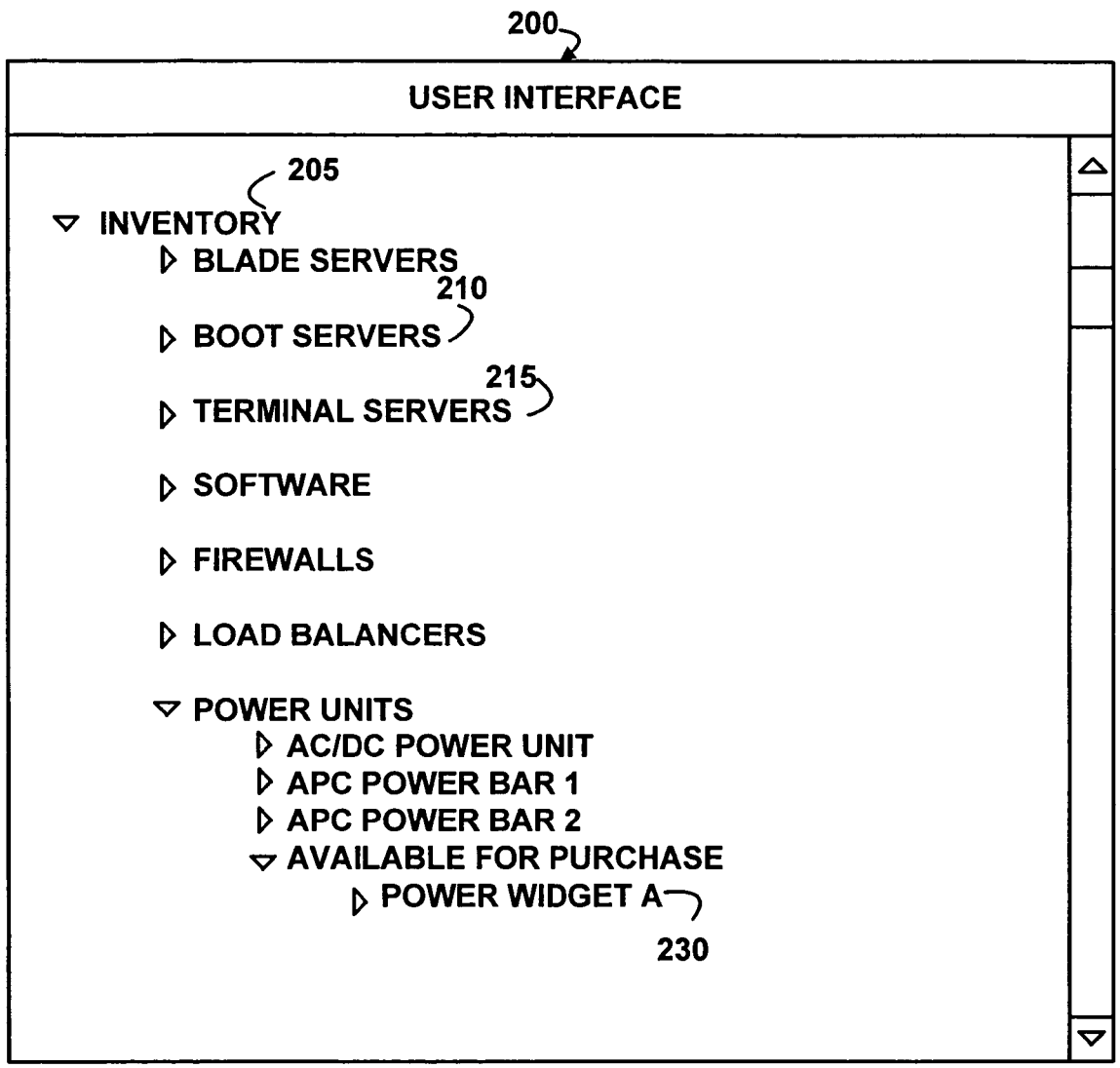
FIG. 2A depicts a pictorial representation of a graphical user interface, according to an embodiment of the invention.

FIG. 2A depicts a pictorial representation of a graphical user interface 200, according to an embodiment of the invention. The browser 134 at the client 133 displays the graphical user interface 200 by downloading and interpreting the page 162. The inventory manager 160 builds the page 162 from the customer resource data 154 and the vendor plug-in 156, as further described below with reference to FIG. 4.

The graphical user interface 200 includes an inventory 205. The inventory 205 is displayed in a tree structure, which may be expanded and contracted to show the resources that are contained in the inventory 205. The inventory 205 represents resources that are present at the customer 132, e.g., the boot servers 210 and the terminal servers 215, and also resources that are not currently present at the customer 132, but that are available for purchase, such as the power widget A 230. The boot servers 210 and the terminal servers 215 are resources currently present at the customer 132, so the inventory manager 160 builds their information in the inventory 205 from the customer resource data 154. The power widget A 230 is available for purchase, so the inventory manager 160 builds its information in the inventory 205 from the vendor plug-in 156. In response to the user selecting the power widget A 230, the user interface of FIG. 2B is displayed, as further described below.

The contents of the graphical user interface 200 are exemplary only, and in other embodiments any appropriate type and quantity of user interface elements and data may be present, and any type and quantity of resources may be currently installed at the customer 132 or available for purchase from the vendor 135.

Figure 2B:
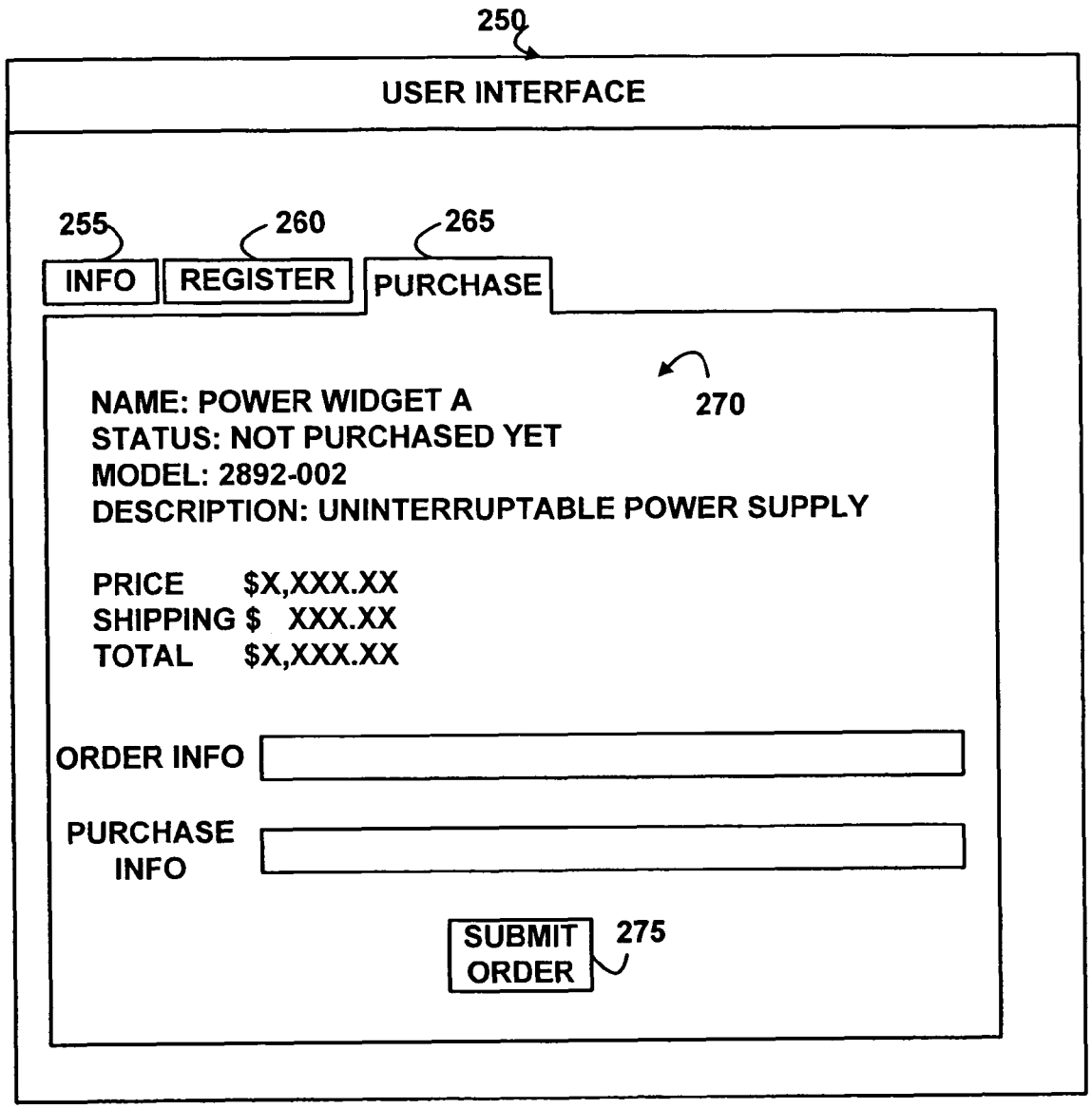
FIG. 2B depicts a pictorial representation of a further graphical user interface, according to an embodiment of the invention.
Figure 3A:
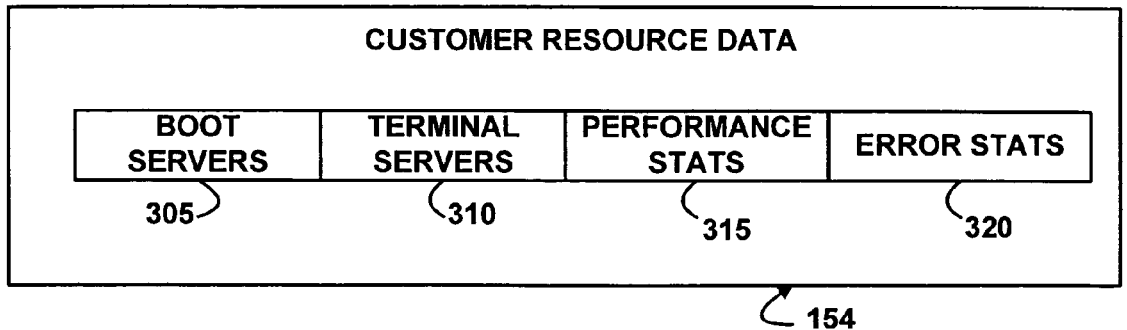
FIG. 3A depicts a block diagram of an example data structure for customer resource data, according to an embodiment of the invention.

FIG. 2B depicts a pictorial representation of a graphical user interface 250 in response to a selection of the power widget A icon 230, as previously described above with reference to FIG. 2A, according to an embodiment of the invention. The browser 134 displays the graphical user interface 250 by downloading and interpreting the page 162. The graphical user interface 250 includes an information tab 255, a register tab 260, and a purchase tab 265. The information tab 255, the register tab 260, and the purchase tab 265, when selected, cause the browser 134 to display respective user interface panels by interpreting the page 162. The purchase tab 265 is shown expanded to include data 270 regarding the resource associated with the power widget A icon 230. The inventory manager 160 obtained the data 270 from the vendor plug-in 156 and built the data 270 into the page 162, as further described below with reference to FIGS. 3B and 4. The data 270 includes a submit order button 275. In response to the order button 275 being selected, the browser 134 sends a purchase request to the server 100, which invokes vendor logic in the vendor plug-in 156 via the inventory manager 160 to perform the purchase, as further described below with reference to FIG. 4. The contents of the graphical user interface 250 are exemplary only, and in other embodiments any appropriate type and quantity of user interface elements and data may be present FIG. 3A depicts a block diagram of an example data structure for the customer resource data 154, according to an embodiment of the invention. The customer resource data 154 describes the resources present at the customer 132 and performance and error statistics related to the customer 132. In various embodiments, each of the clients 133 may have its own respective customer resource data 154, or some or all of the clients 133 at the customer 132 may share the same customer resource data 154. The customer resource data 154 includes a boot servers field 305, a terminal servers field 310, a performance statistics field 315, and an error statistics field 320. The boot servers field 305 describes boot servers at the customer 132, represented by the boot servers resource icon 210 in FIG. 2A. The terminal servers field 310 describes terminal servers at the customer 132, represented by the terminal servers icon 215 in FIG. 2A. Although only terminal servers and boot servers are illustrated as having fields in the customer resource data 154, in other embodiments, any or all of the resources at the customer 132 may have associated fields in the customer resource data 154. The performance statistics field 315 includes data regarding the performance of the resources at the customer 132. The error statistics field 320 includes data regarding errors associated with the resources at the customer 132.

Figure 3B:
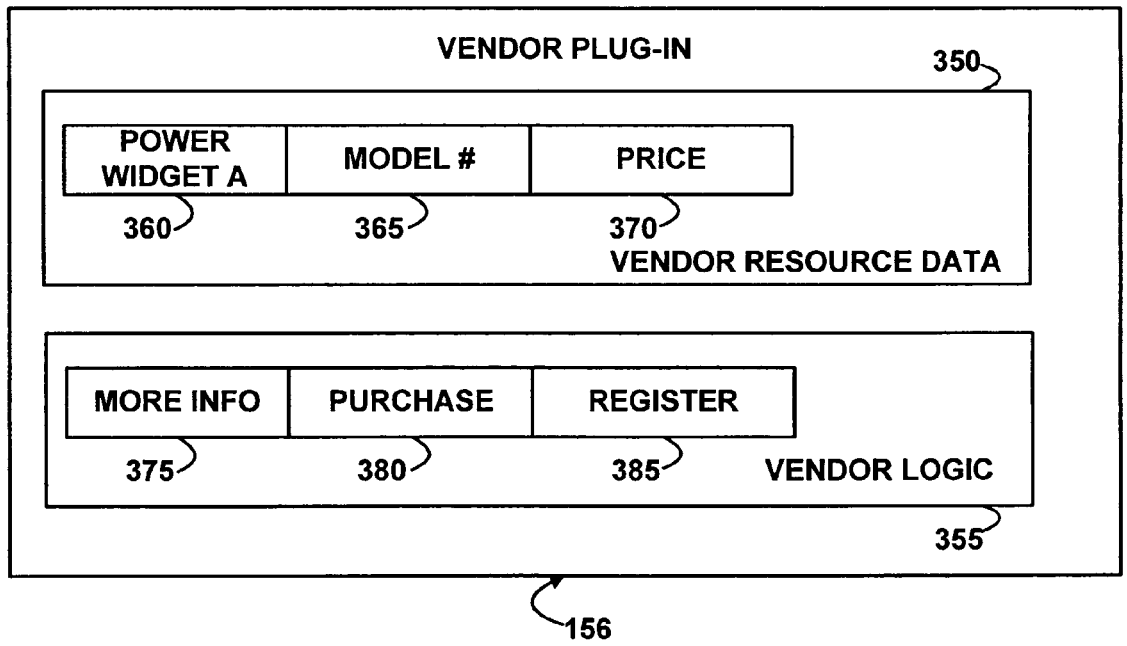
FIG. 3B depicts a block diagram of an example data structure for a vendor plug-in, according to an embodiment of the invention.

FIG. 3B depicts a block diagram of an example data structure for the vendor plug-in 156, according to an embodiment of the invention. The vendor plug-in 156 is supplied by the vendor 135. Each of the vendors 135 may have its own respective vendor plug-in 156. The vendor plug-in 156 includes vendor resource data 350 and vendor logic 355. The vendor resource data 350 includes a power widget A 360, a model number 365, and a price 370. The vendor logic 355 includes more information logic 375, purchase logic 380, and register logic 385.

The power widget A field 360 includes data that describes a resource that is available for purchase by the customer 132. The power widget A field 360 is associated with the power widget A icon 230 in FIG. 2A. The model number field 365 includes a model number of the power widget A resource. The price field 370 includes a price of the power widget A resource. The more information logic 375, when executed in response to selection of the information tab 255 (FIG. 2B), provides the customer 132 with more information regarding the power widget A resource. The purchase logic 380, when executed, purchases the power widget A resource for the customer 132 or otherwise sends a purchase request to the vendor 135. The register logic 385, when executed in response to selection of the register tab 260 (FIG. 2B), registers the customer 132 to receive additional information in the future regarding the resources that are available from the vendor 135. The functions of the vendor logic 355 are further described below with reference to FIG. 4.

Figure 4:
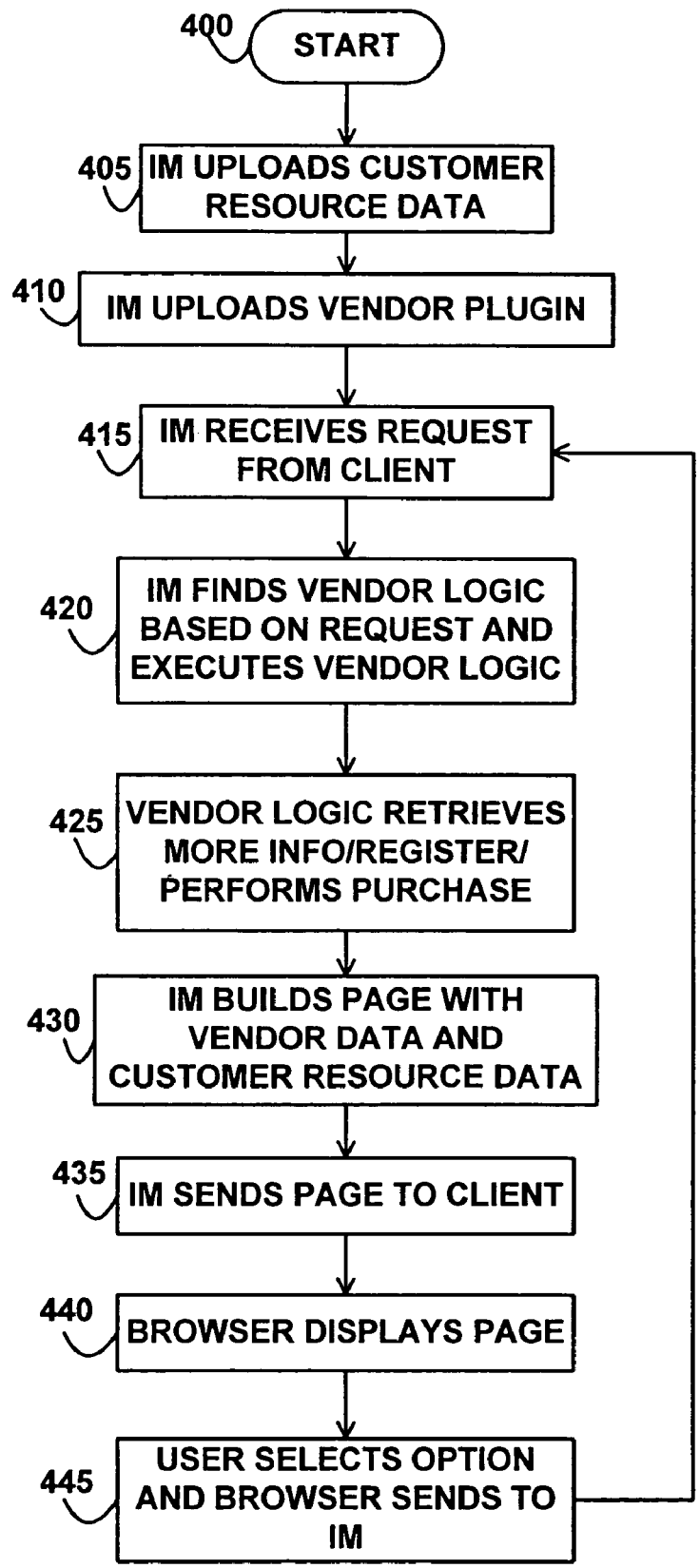
FIG. 4 depicts a flowchart of example processing for an inventory manager, according to an embodiment of the invention.

FIG. 4 depicts a flowchart of example processing for the inventory manager 160, according to an embodiment of the invention. The logic of FIG. 4 may be invoked for each of the clients 133. Control begins at block 400. Control then continues to block 405 where the inventory manager 160 uploads the customer resource data 154. In various embodiments, the inventory manager 160 uploads the customer resource data 154 from the storage interface 112, from a designated client 133 or any other electronic device within the customer 132 via the network 130, from user input (e.g., a system administrator or other appropriate user) at the server 100 or through the client browser 134, or from any other appropriate source. The inventory manager 160 may request the customer 132 to send the customer resource data 154 or receive the customer resource data 154 unsolicited.

Control then continues to block 410 where the inventory manager 160 uploads the vendor plug-in 156. In various embodiments, the inventory manager 160 receives the vendor plug-in 156 from the vendor 135 via the network 130, receives the vendor plug-in 156 from any appropriate computer or other electronic device attached to the network 130, accepts the vendor plug-in 156 from user input (e.g., a system administrator or other appropriate user) at the server 100, or receives the vendor plug-in 156 from any other appropriate source. The inventory manager 160 may request the vendor 135 or any other appropriate source to send the plug-in 156 or receive the plug-in 156 unsolicited.

Control then continues to block 415 where the inventory manager 160 receives a request from the client 133 at the customer 132. In various embodiments, the request may be a request for inventory data, request for more information about a resource (tab 255 in FIG. 2B), a request to purchase a resource from the vendor 135 (button 275 in FIG. 2B), or a request to register to receive future information (tab 260 in FIG. 2B) from the vendor 135 regarding the products and services available from the vendor 135.

Control then continues to block 420 where the inventory manager 160 finds an appropriate entry (e.g., the more information entry 375, the purchase entry 380, or the register entry 385) in the vendor logic 355, if any, based on the request and invokes or otherwise executes this appropriate vendor logic entry.

Control then continues to block 425 where the appropriate entry in the vendor logic 355 performs its operation, such as retrieving more information (the vendor logic 375), sending a purchase request for a resource to the vendor 135 (the vendor logic 380), or registering the client (the vendor logic 385) with the vendor 135 associated with the vendor logic 355.

Control then continues to block 430 where the inventory manager 160 builds the page 162 based on the vendor resource data 350 and the customer resource data 154. Control then continues to block 435 where the inventory manager 160 sends the built page 162 to the client 133 at the customer 132. Control then continues to block 440 where the browser 134 displays the built page 162. Control then continues to block 445 where the user selects an option from the page 162, and the browser sends the request based on the selected option to the inventory manager 160. Control then returns to block 415 where the inventory manager 160 receives the request, as previously described above.

Figure 5:
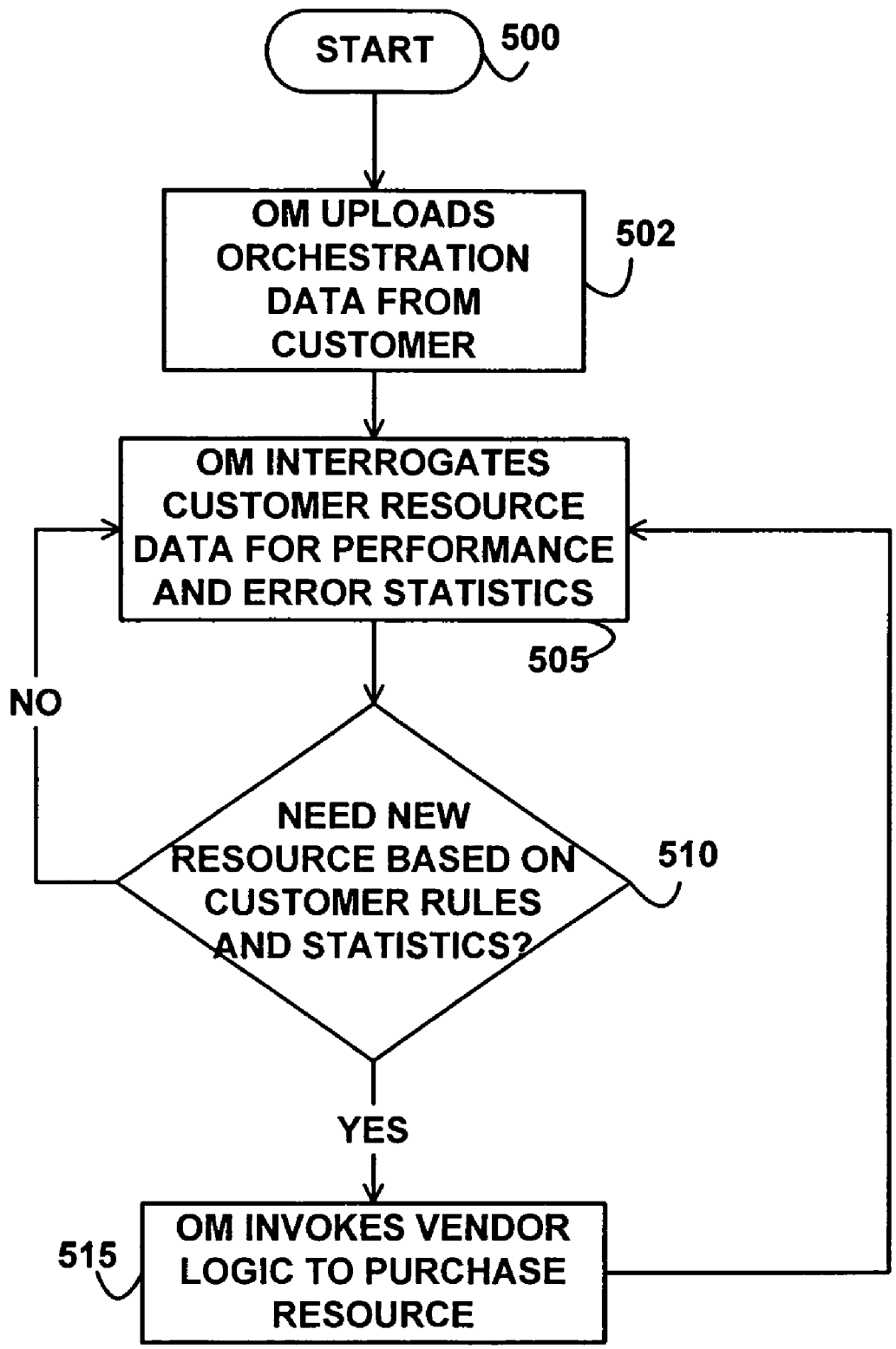
FIG. 5 depicts a flowchart of example processing for an orchestration manager, according to an embodiment of the invention.

FIG. 5 depicts a flowchart of example processing for an orchestration manager 158, according to an embodiment of the invention. Control begins at block 500. Control then continues to block 502 where the orchestration manager 158 uploads the orchestration data 150 from the customer 132.

Control then continues to block 505 where the orchestration manager 158 interrogates the customer resource data 154 for the performance statistics 315 and the error statistics 320. Control then continues to block 510 where the orchestration manager 158 determines whether the customer 132 needs a new resource based on the customer rules in the orchestration data 150, the performance statistics 315, and the error statistics 320. For example, in an embodiment the customer rules include thresholds for the performance statistics 315 and the orchestration manager 158 determines whether a value in the performance statistics 315 is less than a threshold, indicating that one or more resources at the customer 132 are experiencing poor performance. In another embodiment, the customer rules include thresholds for the error statistics 320, and the orchestration manager 158 determines whether a value in the error statistics 320 exceeds the threshold, indicating that a resource at the customer 132 is experiencing an unacceptable failure rate.

If the determination at block 510 is true, then control continues to block 515 where the orchestration manager 158 invokes the purchase logic entry 380 in the vendor plug-in 156 to purchase the resource specified by the customer rules in the orchestration data 150. In this way, for example, if the performance of a resource at the customer 132 is unacceptable, as defined by the customer 132, then the purchase logic 380 purchase an additional resource to improve performance without the need for user intervention. As another example, if the error rate of a resource at the customer 132 is unacceptable, as defined by the customer 132, then the purchase logic 380 purchases a replacement or additional resource to solve the error problem without the need for user intervention. Control then returns to block 505, as previously described above.

If the determination at block 510 is false, then control returns to block 505, as previously described above.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A method comprising:

requesting a plurality of vendor logic from a plurality of respective vendors;

receiving the plurality of vendor logic from the plurality of respective vendors, wherein the plurality of vendor logic perform operations;

receiving customer resource data and a rule from a customer computer, wherein the customer resource data describes a first resource installed at the customer computer;
　wherein the customer resource data comprises performance statistics regarding performance of the first resource at the customer computer and the rule comprises a performance threshold, and wherein the first resource comprises the hardware installed at the customer computer;
determining whether a second resource is needed by the customer computer based on the customer resource data and the rule, wherein the rule comprises an identification of the second resource;
building a page based on the customer resource data and vendor resource data, wherein the page describes an inventory of the first resource installed at the customer computer and at least the second resource available for purchase from one of the plurality of vendors;
sending the page to the customer computer;
finding an entry in one of the plurality of vendor logic in response to a request from the customer computer via the page; and
invoking the entry in the one of the plurality of vendor logic, wherein the entry in the one of the plurality of vendor logic executes and sends a purchase request for the second resource to the one of the plurality of vendors.

2. The method of claim 1, further comprising:
receiving the vendor resource data from the one of the plurality of vendors.

3. A method for configuring a computer, comprising:
configuring the computer to request a plurality of vendor logic from a plurality of respective vendors, wherein the plurality of vendor logic perform operations;
　configuring the computer to receive customer resource data and at least one rule from a customer computer, wherein the customer resource data describes a first resource installed at the customer computer;
　　wherein the customer resource data comprises performance statistics regarding performance of the first resource at the customer computer and the rule comprises a performance threshold and wherein the customer resource data comprises error statistics regarding errors associated with the first resource at the customer computer and the rule comprises an error threshold;
　configuring the computer to receive the plurality of vendor logic from the plurality of respective vendors;
　configuring the computer to determine whether a new resource is needed by the customer computer based on the customer resource data and the rule, wherein the rule comprises an identification of the new resource;
　configuring the computer to find an entry in one of the plurality of vendor logic; and
　configuring the computer to invoke the entry in the one of the plurality of vendor logic, wherein the entry in the one of the plurality of vendor logic executes and purchases the new resource if the new resource is needed.

4. An inventory management service method comprising:
receiving a plurality of customer resource data from a plurality of customer computers, wherein the plurality of customer resource data describe a plurality of first resources installed at the plurality of customer computers;
　wherein the plurality of customer resource data comprises performance statistics regarding performance of the plurality of first resources installed at the plurality of customer computers and the plurality of rules comprise performance thresholds and wherein the plurality of customer resource data comprises error statistics regarding errors associated with the plurality of first resources at the plurality of customer computers and the plurality of rules comprise error thresholds;
requesting a plurality of vendor log and vendor resource data from a plurality of respective vendors,
receiving the plurality of vendor logic and vendor resource data from a plurality of vendors, wherein the vendor resource data describes a plurality of new resources available from the plurality of vendors, and wherein the plurality of vendor logic perform operations;
communicating availability of the plurality of new resources to the plurality of customer computers;
receiving a plurality of rules from the plurality of customer computers, wherein the plurality of rules comprise an identification of the plurality of new resources;
finding a plurality of entries in the plurality of vendor logic in response to a plurality of requests from the plurality of customer computers; and
sending a plurality of purchase requests to the plurality of vendors for the plurality of new resources via invoking and executing the plurality of entries in the plurality of vendor logic.

5. The method of claim 4, further comprising:
deciding to perform the sending based on the customer resource data.

6. The method of claim 4, further comprising:
deciding to perform the sending based on a plurality of requests from the plurality of customer computers.

7. The method of claim 4, further comprising:
deciding to perform the sending based on the plurality of rules and the plurality of customer resource data.

* * * * *